United States Patent Office 3,331,842
Patented July 18, 1967

3,331,842
CARBALKYLOXY-PIPERAZINE
DERIVATIVES
Michel Delalande, 18 bis Rue Henri Heine,
Paris, France
No Drawing. Filed July 7, 1964, Ser. No. 380,943
Claims priority, application France, July 10, 1963,
941,011; July 24, 1963, 942,485, 942,486, 942,487,
942,488, 942,489 942,490; Dec. 20, 1963, 957,906
6 Claims. (Cl. 260—268)

This invention relates to a new corrective medicine for muscular spasms, in particular for spasms of smooth muscle fibre (excepting spasms of mechanical origin) and in particular, hypervagotonic symptons, in the form of derivatives of carbalkyloxy piperazine, of the following structural formula:

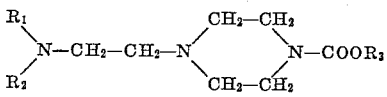

in which the radicals $R_1$, $R_2$, $R_3$ may be saturated or unsaturated alkyl groups, saturated or partially-saturated cyclic groups, nitrogenated, sulphurated, or oxygenated, heterocyclic groups, arylic groups with one or more nuclei, substituted or non-substituted. The $R_1$ or $R_2$ groups may be hydrogenated. Finally, one of these last two groups, may be hydrogenated, the other including one of the above radicals. Preferably compounds of the following formula are formed in accordance with the present invention,

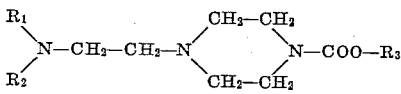

in which $R_1$ is selected from the group consisting of ethyl, isopropyl, isobutyl, and cyclohexyl; $R_2$ is selected from the group consisting of isopropyl, ethyl, isobutyl, cyclohexyl radicals, and hydrogen, and $R_3$ is selected from the group consisting of ethyl, isopropyl, isobutyl, and cyclohexyl radicals.

These substances may be used, either in the form of the free base, or as the salts of various acids, or in the halogen alkylated state.

The amino-ethane halides corresponding to the intended substitutions having the formula,

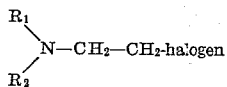

wherein $R_1$ and $R_2$ have the same meaning as in the immediately preceding definition for $R_1$ and $R_2$ are combined with one of the amino-piperazine groups, the other amino group being condensed with an alcoholic chlorocarbonate or phenol chlorocarbonate, $R_3$—OH.

Examples of the preparation of substances according to the invention will now be described.

EXAMPLE 1

A new, antispasmodic derivative, (N($\beta$-diethylamino)-ethyl,N' - carbethoxy)-hexahydropyrazine corresponding to the structural formula:

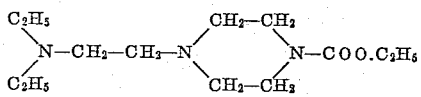

This substance is characterized in that:
(1) Its empirical formula is: $C_{13}H_{27}N_3O_2$;
(2) Its molecular weight is: MW 257;
(3) Its nitrogen content is: 16.34 percent;

(4) Its physical properties are: a viscous, sufficiently water-soluble liquid, highly soluble in alcohol, ether, acetone and benzene, the boiling point whereof is 130° at 1 mm. Hg;
(5) It forms alkyl-halogenated, mineral or organic salts, in particular:
A dichlorohydrate, extremely soluble in water, greater than 50%, the solution whereof has a pH of about 4, at 10% concentration;
A monochlorohydrate, similarly highly water-soluble, the 10% solution whereof has a pH of about 7.

The present invention relates to the base described and its different salts resulting from the combination of the base with mineral or organic acids as well as its alkyl halides.

The (N($\beta$-diethylamino)-ethyl-N' - carbethoxy) - hexahydropyrazine is prepared by condensing diethylaminochloroethane with piperazine and combining the product obtained with ethyl chlorocarbonate.

The preparation is as follows:
(1) 1 molecule of diethylamino-chloroethane-chlorohydrate is dissolved in 500 ml. water. The solution obtained is introduced, dropwise while stirring, in the cold, into a solution consisting of 500 ml. water, 1 mol piperazine and 2 mols sodium carbonate. The introduction continued for about 3 hours.

500 ml. of 50% sodium carbonate is poured into the cooled reaction mixture, which causes the liberation and salting-out of the organic bases. The product is extracted with ether, dried over sodium carbonate pellets, the ether evaporated, and the residue fractionated.

The required product is collected at 86° under 0.5 mm. Hg.

(2) 1 molecule of the above substance is treated in 500 ml. of absolute alcohol, with 1 mol ethylchlorocarbonate. The mixture is heated with recirculation during a period of three hours. The cooled reaction mixture receives the addition of one molecule of sodium carbonate. 1,000 ml. water are added and the result extracted with ether. The ether solution is washed with water, dried over sodium sulphate, and the ether evaporated. The residue is fractionated. The product is collected at 130° under 1 mm. Hg.

*Nitrogen dosage.* — Calculated: 16.34%. Found, 16.28%.

The chlorohydrate and the dichloro-hydrate can be formed in an acetone medium and recrystallized in alcohol.

The dichlorohydrate fuses at about 225° with decomposition.

*Therapeutic Properties.*—The substance described possesses simultaneously the properties of papaverine and atropine. Clinically the indications extend to the therapy of spasms of the smooth muscle, the digestive tract, circulatory tracts, bronchia, smaller pelvis; and, in the more general sense, disorders of the parasympathetic system.

*Method of use.*—The substance according to the present invention can be incorporated in medical preparations, whether soluble or insoluble, for oral, rectal, local or parenteral administration; this constituent being incorporated in doses or concentrations suitable for the administration of 40 mg. to 2 g. daily of the active principle, without restriction for therapeutic application:

Specifically, in ampoules dosed with 20 mg. of the active principle;

Specifically, in tablets dosed with 200 mg. to 1 g. of the active principle in a pharmaceutical excipient in the form of the salt most suitable for such preparation;

Specifically, in suppositories dosed with 200 mg. to 1 g. the substance in the form of the base or salts suitable for such preparation in a natural or synthetic, inert excipient.

EXAMPLE 2

A new, antispasmodic derivative (N(β-diethylamino)-ethyl-N′-carbisopropyloxy) - hexa - hydropyrazine, corresponding to the structural formula:

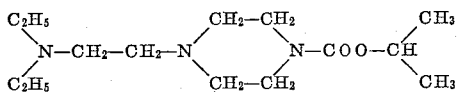

This substance is characterized in that:
(1) Its empirical formula is $C_{14}H_{29}N_3O_2$;
(2) Its molecular weight is MW 271;
(3) Its nitrogen concentration is 15.49%;
(4) Its physical properties are as follows: a viscous, appreciably water-soluble liquid, highly soluble in alcohol, ether, acetone and benzene, with a boiling point of 135° at 0.6 mm. Hg;
(5) It forms mineral or organic salts of the alkyl halides; in particular—the dichlorohydrate, extremely soluble in water, greater than 50%, the aqueous 10% solution having a pH of about 4, the monochlorohydrate, likewise highly-soluble, with a pH of about 7 for the 10% solution.

The present invention refers to the base described and its various salts resulting from the combination of the base with mineral or organic acids as well as its halogen alkylates.

The preparation of (N(β-diethylamino)-ethyl-N′-carboisopropyloxy)-hexa-hydropyrazine is conducted by condensing diethylamino-chloroethane with piperazine. The resulting triamine is combined with isopropyl-chlorocarbonate.

This method of preparation is as follows:

(1) 1 molecule of diethylamino-chloroethane chlorohydrate is dissolved in 500 ml. water. The resulting solution is introduced dropwise with stirring in the cold state into a solution consisting of 500 ml. water, 1 mol piperazine, and 2 mols sodium carbonate. The process lasts for about three hours.

Into the cooled reaction mixture, 500 ml. of 50% sodium carbonate solution is poured which causes the liberation and salting-out of the bases. These are extracted with ether, dried over sodium carbonate pellets, the ether evaporated off, and the residue fractionated. The required product passes at 86° under 0.5 mm. Hg.

(2) 1 mol of the substance obtained as above is treated in 500 ml. absolute alcohol with 1 mol of isopropyl chlorocarbonate. The mixture is heated with recirculation for three hours. The cooled reaction mixture is treated with 1 mol soda, 1000 ml. of water added, and extracted with ether. The ethereal solution is washed with water, dried over sodium sulphate and freed from the ether. The residue is fractionated. The required product is collected at 135° under 0.6 mm. Hg.

*Nitrogen dosage.*—Calculated, 15.49%. Found, 15.30%.

The chlorohydrates are formed in an acetone solution by the addition of a calculated quantity of concentrated hydrochloric acid. The dichlorohydrate fuses at 230° with decomposition.

*Therapeutic properties.*—The substance described possesses simultaneously, the properties of papaverine and atropine.

Clinically, its indications extend to the therapy of spasms of the bronchia, smooth muscles, digestive tract, circulatory tracts, organs of the smaller pelvis; and, in general, parasympathetic disturbances.

*Method of use.*—The substance according to this example can be used in soluble or insoluble medicinal preparations for administration orally, per rectum, locally or parenterally, this component being incorporated in suitable doses or concentrations for the daily administration of 30 mg. to 1.5 g. of the active principle, without this dose being restrictive for therapeutic application: in particular, in ampoules dosed with 15 mg. of the active preparation:

In tablets dosed with 150 to 750 mg. of the active principle in a pharmaceutically appropriate excipient in the state of the most suitable salt for such preparation;

In suppositories dosed with 150 to 750 mg. of the substance in the form of the base or salts suitable for such preparation, in an inert, natural or synthetic excipient.

EXAMPLE 3

A new, anticholinergetic derivative, (N(β-cyclohexylamine-)ethyl-N′ - carbisopropyloxy - )hexa-hydropyrazine corresponding to the structural formula:

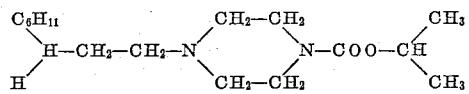

where $C_6H_{11}$ is the cyclohexyl radical.

This substance is characterized in that:
(1) Its empirical formula is $C_{16}H_{31}N_3O_2$;
(2) Its molecular weight is MW 297;
(3) Its nitrogen concentration is 14.14%;
(4) Its physical properties are as follows: a viscous liquid, little soluble in water but soluble in alcohol, ether, acetone, and benzene, with a boiling point of 180° at 5 mm. Hg.
(5) It forms mineral and organic salts; in particular—

The dichlorohydrate, highly water-soluble, greater than 40%, the pH of the 10% aqueous solution being about 4;

The monochlorohydrate is also highly soluble. The aqueous solution has a pH of about 7.

The present invention refers to the base as described and its various salts resulting from combination of the base with mineral or organic acids.

*Preparation.*—(N(β-cyclohexylamino-)ethyl - N′ - carbisopropyloxy-)hexahydropyrazine is obtained by preliminary condensation of cyclohexylamino-bromo-ethane with piperazine. The resulting triamine is combined with isopropyl chlorocarbonate.

This preparation is as follows:

(1) β - bromoethyl - cyclohexylamino - (*bromohydrate*).—100 g. cyclohexylamino-ethanol is dissolved in a mixture of 80 ml. water and 215 ml. hydrobromic acid of 1.58 density. The mixture is heated with recirculation for one hour, then distilled until the temperature exceeds 102°. The distillation is then stopped and heating with recirculation resumed for one hour. This process is repeated three times (reflux heating followed by distillation). After the third distillation of the water, the mixture is heated with recirculation for a last time for three hours. The water is then distilled off, followed by the stable azeotrope of HBr (passing at 126°) until all is recovered, including the preceding distillates, in a total of 250 ml. The cooled product is crystallized by the addition of acetone. This product is dried and recrystallized from ethyl alcohol. The product should contain 55–56% bromine, M.P. 240°, with decomposition.

(2) *Condensation with piperazine.*—½-mol of the above brominated derivative is dissolved in 500 ml. alcohol at 96°. Separately, ½-mol of piperazine is dissolved in 580 ml. of water. The piperazine solution is brought to boiling point and receives dropwise with stirring over a period of about six hours, the alcoholic solution of the brominated derivative.

The reaction mixture is concentrated in vacuo. Piperazine hydrobromide crystallizes and is removed periodically to enable the concentration to proceed to a final volume of about 270 ml. Then, an equal volume of concentrated soda lye is added, the mixture agitated and left to decant for one night. The aqueous phase is separated and extracted with ether. The ethereal solution is added to the upper layer of the preceding, causing a further separation of the aqueous phase.

The ethereal layer is then freed from the ether and the residue fractionated in vacuo. The product is collected at 140–145° under 7–8 mm. Hg.

(3) *Condensation with isopropyl chlorocarbonate.*—
2 mols of the above product are dissolved in 2000 ml. benzene and 1 mol of isopropyl chlorocarbonate diluted with its own volume of benzene is added.

The reaction is exothermal. The mixture is allowed to cool and stirred with slightly more than the calculated quantity of soda lye necessary to set free all the bases. The benzene solution is decanted, dried, and the solvent evaporated. The residue is fractionated in vacuo. The required product is collected at 180° under 5 mm. Hg.

*Nitrogen dosage.* — Calculated: 14.15%. Found: 14.08%.

The hydrochlorides are prepared from an acetone medium by the addition of calculated quantities of concentrated hydrochloric acid. The dichlorohydrate melts at about 225°, with decomposition.

*Therapeutic properties.*—The substance described has pharmacological anti-cholinergetic properties of the atropine type. Its action extends to all stages of parasympathetic affection. The therapeutic indications are all the same as for atropine, but with a more pronounced influence at the level of the bronchia.

*Method of use.*—The substances according to this example can be used in soluble or insoluble medicinal preparations for administration per os, per rectum, locally or parenterally, including this component in doses or concentrations suitable for the daily administration of 10 mg. to 0.5 g. of the active principle, although this dose is not restrictive for the therapeutic administration: in particular, in ampoules dosed with 5 mg. of the active principle; in tablets dosed with 50–250 mg. of the active principle, in a suitable pharmaceutical excipient, in the form of the most convenient salt for such a preparation; in suppositories dosed with 50–250 mg. of the substance in the form of the base or suitable salts thereof, in an inert, natural or synthetic excipient.

EXAMPLE 4

A new spasmolytic derivative, (N-($\beta$-di-isobutylamino-)ethyl-N'-carboisopropyloxy-)hexa-hydropyrazine, corresponding to the structural formula:

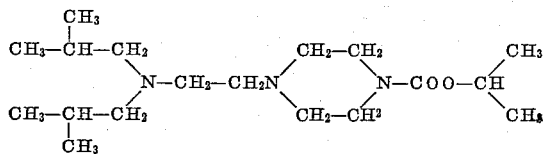

This substance is characterized in that:
(1) Its empirical formula is $C_{18}H_{37}N_3O_2$;
(2) Its molecular weight is 327;
(3) Its nitrogen content is N=12.84%;
(4) Its physical properties are; a viscous liquid, slightly water-soluble, soluble in alcohol, ether, acetone and benzene, with a boiling point of 140° under 0.1 mm. Hg.;
(5) It forms mineral or organic salts and alkylate halides, viz, the dichlorohydrate, highly water-soluble, greater than 40%, the 10% aqueous solution has a pH of about 4; the monochlorohydrate, also highly water-soluble; the 10% aqueous solution has a pH of about 7.

The present invention refers to the base described and its various salts resulting from combination of the base with mineral or organic acids as well as its alkylate halides.

(N($\beta$ - diisobutylamino - )ethyl - N' - carboisopropyloxy-)-hexa-hydropyrazine, is prepared by the condensation of diisobutylamino-bromoethane with piperazine and of the resulting product with isopropyl chlorocarbonate. The preparation is as follows:

(1) *$\beta$-bromoethyl-diisobutylamine-(hydrobromide).*—
44 g. of diisobutylamino-ethanol are dissolved in 30 ml. of water and 78.5 ml. of hydrobromic acid of 1.58 density. The amino-alcohol should be added dropwise to the hydrobromic acid solution cooled to 0°. This mixture is heated under reflux for one hour. All the fractions passing at 100° are distilled off (about 43 ml.). Distillation is stopped and the reflux heating repeated for one hour. This process is repeated three times (reflux heating +distillation).

After the third distillation of the water, the reflux heating is repeated for three hours.

The water is then distilled off, followed by the stable HBr azetrope distilling at 126°. The cooled residue is crystallized by adding acetone. The product is dried and washed in acetone. The final product should contain 50–51% of bromine.

(2) *Condensation with piperazine.*—1 molecule of the brominated derivative obtained as above, is dissolved in 500 ml. of absolute alcohol. This solution is added dropwise in the presence of heat and while agitating, to a solution of 3 molecules of anhydrous piperazine in 1000 ml. of absolute alcohol. The operation lasts for about three hours.

The solution obtained is cooled and chilled in a bath at 0°: the piperazine hydrobromide crystallizes out. This is dried. The alcohol is expelled and the residue distilled in vacuo. The product distils at 116° at 0.2 mm. Hg.

(3) *Condensation with isopropyl chlorocarbonate.*—
1 molecule of the above product, dissolved in 1 litre of benzene, is treated with 50 g. isopropyl chlorocarbonate dissolved in 200 ml. of benzene. The reaction is highly exothermal. The product is cooled and the benzene solution agitated with 200 ml. of concentrated soda lye. 50 g. of the chlorocarbonate, dissolved in benzene is then added carefully, followed by 200 ml. of sodium carbonate. This operation is repeated three times in all.

After the last addition of sodium carbonate, the mixture is decanted, the benzene dried over sodium sulphate, and the solvent evaporated in vacuo. The residue is fractionated in vacuo. The product is collected at 140° and 0.1 mm. Hg.

*Nitrogen dosage.* — Calculated: 12.84%. Found: 12.79%.

The dichlorohydrate can be formed in dry ether by passing a current of dry HCl gas. The dichlorohydrate melts at about 170° with decomposition.

*Therapeutic properties.*—The substance described above has the same experimental properties as papaverine, acting on the whole of the smooth muscular tissue, the digestive tract, the vascular system, the bronchia, and the organs in the small pelvis. Clinically, the substance acts preventively and curatively on spasms of different origin (non-mechanical), in the same regions of the organism.

*Method of use.*—The substance according to this example can be used in medicinal preparations, soluble or insoluble, for administration orally, rectally, locally or parenterally; the preparation being incorporated in doses or concentrations suitable for the daily administration of 10 mg. to 0.50 g. of the active principle, without this dose being restrictive for therapeutic application, in particular, in ampoules dosed with 5 mg. of the active principle; in tablets dosed with 50 to 250 mg. of the active principle, in a pharmaceutically suitable excipient in the state of the most appropriate salt for such a preparation; in suppositories dosed with 50 to 250 mg. of the substance in the form of the base or salts suitable for such preparation, in an inert, natural or synthetic excipient.

EXAMPLE 5

A new spasmolytic derivative, (N($\beta$-diisobutylamino-)ethyl-N'-carbocyclohexyloxy)-hexa-hydropyrazine corresponding to the structural formula:

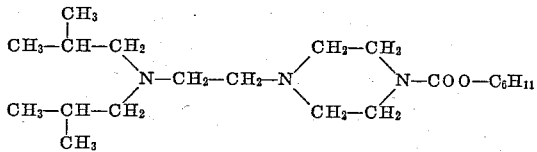

where $C_6H_{11}$ is the cyclohexyl radical.

This substance is characterized as follows:

(1) The empirical formula is $C_{21}H_{41}N_3O_2$, and the structural formula is as above;
(2) The molecular weight is 367;
(3) The nitrogen content is 11.44%;
(4) The physical properties are: a viscous liquid, very little soluble in water, soluble in ether, acetone, alcohol and benzene, crystallizing at low temperature, with a boiling point of 183–185° with 0.2 mm. Hg;
(5) Formation of mineral or organic salts and halogen-alkylates, in particular: the dichlorohydrate, highly water-soluble, greater than 50%, the pH of the 10% aqueous solution being about 4; the monochlorohydrate, likewise highly water-soluble, pH of the 10% aqueous solution being about 7.

The present invention refers to the base as described and the different salts thereof produced by combination with mineral or organic acids, also the halogen-alkylates.

(N-(β-diisobutylamino)-ethyl - N′ - carbocyclohexyloxy)-hexa-hydropyrazine is prepared by condensation of diisobutylamino-bromoethane with piperazine and of the resulting product with cyclohexyl-chlorocarbonate. This preparation is as follows:

(1) *β-bromoethyl-diisobutylamine (hydrobromide)*.— 44 g. of diisobutylamino-ethanol are dissolved in 30 ml. water and 78.5 ml. hydrobromic acid of 1.58 density. The amino-alcohol should be added dropwise into the acid solution, cooled to 0°.

The mixture is heated under reflux for one hour. All the fractions passing at 100° are then distilled off: (about 43 ml.). Distillation is then stopped and reflux heating repeated for one hour. This process is repeated three times (reflux heating followed by distillation). After the third distillation of the water, the product is reheated under reflux for a further three hours. The water is then distilled off, followed by the stable azetrope of HBr, distilling at 126°. The cooled residue is crystallized with added acetone. The product is dried and washed with acetone. The final product should contain 50–51% of bromine.

(2) *Condensation with piperazine*.—1 molecule of the above brominated derivative is dissolved in 500 ml. of absolute alcohol. This solution is added dropwise, hot and with agitation, to a solution of 3 mols of anhydrous piperazine in 1000 ml. absolute alcohol. The operation lasts for about three hours. The mixture is cooled, at first spontaneously, then in ice. The piperazine hydrobromide crystallizes out. This is dried, the alcohol expelled and the residue distilled in vacuo. The product distils at 116° with 0.2 mm. Hg.

(3) *Condensation with cyclohexyl-chlorocarbonate*.— ⅓ molecule of the above substance is dissolved in 200 ml. of benzene and to this solution is added a mixture of ⅓ molecule of cyclohexylchlorocarbonate in 50 ml. benzene. The reaction is exothermal. The product is allowed to cool and the benzene solution agitated with 20 ml. of concentrated soda lye. A further ⅓ molecule of cyclohexylchlorocarbonate dissolved in 50 ml. benzene, is added, followed by a further 20 ml. of sodium carbonate. This operation is repeated a third time. After the last addition of sodium carbonate, the solution is decanted, the benzene layer dried over sodium sulphate, and the solvent evaporated in vacuo. The residue is fractionated in vacuo. The product distils at 183–185° with 0.2 mm. Hg, tending to crystallize below 15°.

*Nitrogen Dosage*.—Calculated: 11.44%. Found: 11.55%.

The dichloro-hydrate can be formed in dry ether by saturating the ethereal solution with a current of dry, gaseous HCl. It melts at about 170° with decomposition. It is appreciably hydroscopic.

*Therapeutic properties*.—The substance described, has the same experimental properties as papaverine, acting on the whole of the smooth muscular tissue, the digestive tract, the vascular system, the bronchia and the organs of the small pelvis.

Clinically, the substance has a preventive and curative action on spasms of different origin (non-mechanical) in the same regions of the organism.

*Method of use*.—The substance according to this example can be employed in medicinal preparations, soluble or insoluble, for administration orally, rectally, locally or parenterally, this preparation being incorporated in doses or concentrations suitable for administering 10 mg. to 0.5 g. of the active principle per diem; this dosage not being therapeutically critical, in particular: in ampoules with 5 mg. of the active principle; in tablets containing 50–250 mg. of the active principle in a pharmaceutically suitable excipient in the form of the most convenient salt for such preparation; in suppositories dosed with 50–250 mg. of the substance in the form of the base or the salts suitable for such preparation, in an inert, natural or synthetic excipient.

EXAMPLE 6

A new antichlinergic derivative (N-(β-cyclohexylamino)-ethyl-N′-carbocyclohexyloxy - ) - hexa - hydropyrazine, corresponding to the structural formula:

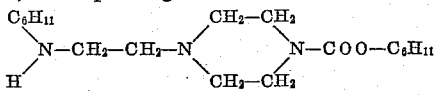

$C_6H_{11}$ being the cyclohexyl radical.

This substance is characterized by the following:
(1) The empirical formula is $C_{19}H_{35}N_3O_2$;
(2) The molcular weight is 337;
(3) The nitrogen content is 12.46%;
(4) The physical properties are are follows: a viscous liquid, little soluble in water, soluble in alcohol, ether, acetone; boiling point 192° at 0.2 mm. mercury.
(5) The formation of mineral and organic salts; in particular: the dichlorohydrate, highly soluble in water, greater than 40%; pH of the 10% aqueous solution being about 5; The monochlorohydrate, likewise highly water-soluble. The pH of the aqueous solution is about 7.

The present invention refers to the base described and the different salts thereof formed by combination of the base with mineral or organic acids. (N-(β-cyclohexylamino) - ethyl - N′ - carbocyclohexyloxy) - hexa - hydropyrazine is prepared by condensation of cyclohexylamino-bromoethane with piperazine. The triamine obtained is combined with cyclohexylchlorocarbonate.

This preparation proceeds as follows:

(1) *β-bromoethyl-cyclohexylamine (hydrobromide)*.— 100 g. of cyclohexylamino-ethanol are dissolved in a mixture of 80 ml. water and 215 ml. hydrobromic acid of density 1.58. The mixture is heated under reflux for one hour and distilled until the temperature is above 102° C.

The distillation is then stopped and the reflux heating resumed for one hour. The same process is repeated three times (reflux heating followed by distillation). After the third distillation of the water the mixture is further heated with reflux, for three hours. The water is then distilled off, followed by the stable HBr azeotrope (distilling at 126°) until, including the preceding distillates, a total of 250 ml. is collected. The cooled product is crystallized by adding acetone.

The product is dried and recrystallized from ethyl alcohol. The final product should contain 55–56% bromine: melting point 240°, with decomposition.

(2) *Condensation with piperazine*.—133 g. of the above brominated derivative are dissolved in 500 ml. alcohol at 96°. Separately 120 g. of piperazine are dissolved in 500 ml. of alcohol at 96°.

The piperazine solution is heated to about 60° and the solution of the brominated derivative introduced dropwise over a period of ten hours, all without agitating.

The reaction mixture is concentrated in vacuo, then 1000 ml. ether is added. The piperazine hydrobromide precipitates and this is dried. The filtrate is evaporated in vacuo and the residue fractionated in vacuo. The product is collected at 121° and 0.75 mm. Hg.

(3) *Condensation with cyclohexyl-chlorocarbonate.*—53 g. of the above product are dissolved in 250 ml. benzene. A benzene solution of cyclohexylchlorocarbonate containing 19 g. of the chlorocarbonate is added with stirring.

The mixture is cooled and stirred with slightly more than the calculated quantity of soda lye necessary to free all the bases.

The benzene solution is decanted, dried, and the solvent evaporated. The residue is fractionated in vacuo. The product is collected at 192° with 0.2 mm. Hg.

*Nitrogen dosage.* — Calculated: 12.46%. Found: 12.31%.

The chlorohydrates are prepared in an acetonic medium by adding calculated quantities of concentrated hydrochloric acid. The dichlorohydrate melts at about 225° with decomposition.

*Therapeutic properties.*—The substance described has the same anticholinergic pharmaceutical properties as atropine. Its action is manifested at all stages of parasympathetic affection. The therapeutic indications are all as for atropine but with a somewhat greater influence on the bronchia.

*Method of use.*—The substance according to this example can be used in medicinal preparations, soluble or insoluble, for administration orally, rectally, locally or parenterally, incorporating this constituent in doses or concentrations suitable for the daily administration of 5 mg. to 0.25 g. of the active principle per diem; without this dosage being critical for therapeutic application: particularly, in ampoules dosed with 2.5 mg. of the active principle; in tablets dosed with 25–125 mg. of the active principle in a pharmaceutically suitable excipient in the form of salt most appropriate for the preparation; in suppositories dosed with 25–125 mg. of the substance in the form of the base or salts most appropriate for the particular preparation; in an inert excipient or natural or synthetic origin.

EXAMPLE 7

A new anti-cholinergic derivative, (N-(β-cyclohexylamino-)-ethyl-N'-carbethoxy-)-hexahydropyrazine, corresponding to the following structural formula:

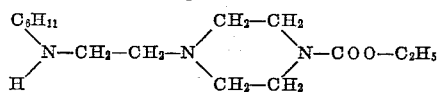

$C_6H_{11}$ being the cyclohexy radical.

This substance is characterized by:

(1) The empirical formula is $C_{15}H_{29}N_3O_2$ and its structure is as given above;

(2) The molecular weight is 283;

(3) The nitrogen content is 14.84%;

(4) The physical properties are as follows: a viscous, sparingly water-soluble liquid, soluble in alcohol, ether, acetone, and benzene, with a boiling point of 165–170° at 4–5 mm. mercury.

(5) The formation of mineral or organic salts, in particular: the dichlorohydrate, highly soluble in ester, greater than 40%, the pH of the 10% aqueous solution being about 4; the monochlorohydrate, also highly water-soluble, the pH of the 10% aqueous solution of which is about 7.

The present invention refers to the base described here and its different salts resulting from combination of the base with mineral or organic acids. (N-(β-cyclohexylamino-)ethyl-N'-carbethoxy-)hexa-hydropyrazine is prepared by condensation of β-bromoethyl-cyclohexylamine in the form of the hydrobromide, with carbethoxy-piperazine. This preparation proceeds as follows:

(1) *β-bromomethyl-cyclohexylamine (hydrobromide).*—100 g. of cyclohexylamine-ethanol are dissolved in a mixture of 80 ml. water and 215 ml. hydrobromic acid of density 1.58. This is heated under reflux for one hour and distilled until the temperature is past 102° Distillation is then stopped and reflux heating repeated for one hour. The same process (1 reflux plus distillation) is repeated three times. After the third distillation of the water the mixture is finally reheated with reflux for three hours. Distillation (of the water followed by the stable HBr azeotrope distilling at 126°) is then resumed until a total (including the preceding distillates) of 250 ml. has been collected. The cooled product is crystallized by adding acetone. This is dried and recrystallized from ethyl alcohol. The end product should contain 55–56% bromine, M.P. 240° with decomposition.

(2) *Condensation with carbethoxy-piperazine.*—0.25 mol. of the above, brominated derivative (about 72 g.) is dissolved in 500 ml. water. 250 ml. benzene is added then gradually 0.25 mol soda solution, stirring after each addition.

The benzene solution is treated by reflux for six hours with 0.50 mol. carbethoxy-piperazine. After 24 hours, the chlorohydrate partially crystallizes. The whole mixture is agitated with an excess of soda lye. The benzene phase is freed from the benzene and the residue fractionated. The fraction at 165–170° is collected at 4–5 mm. Hg.

*Nitrogen dosage.*—Calculated: 14.80%. Found 14.90%.

The chlorohydrate and dichlorohydrate can be formed in dry acetone. They are purified by recrystallizing in alcohol. The dichlorohydrate melts at 215° ±1°.

*Therapeutic properties.*—The substance described has pharmacological anti-cholinergic properties of the atropine type. Its action is manifested at all stages of parasympathetic affection. The therapeutic indications are all as for atropine but with a somewhat greater influence on the bronchia.

*Method of use.*—The substance according to this example can be used in medicinal preparations, soluble or insoluble, for administration orally, rectally, flocally, or parenterally, incorporated as a constituent in doses or concentrations suitable for the daily administration of 20 mg. to 1 g. of the active principle; without this dose being restrictive for therapeutic purposes: in particular, in ampoules dosed with 10 mg. of the active principle; in tablets dosed with 100 to 500 mg. of the active principle in a pharmaceutically-acceptable excipient in the form of the salt most suitable for such a preparation; in suppositories dosed with 100 to 500 mg. of the substance in the form of the base or salts suitable for such a preparation, in an inert, organic or synthetic excipient.

What I claim is:

1. A compound having the general formula:

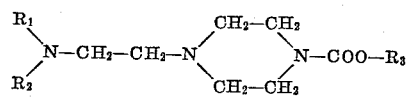

in which $R_1$ is selected from the group consisting of isopropyl, isobutyl, and cyclohexyl; $R_2$ is selected from the group consisting of isopropyl, isobutyl, cyclohexyl radicals, and hydrogen, and $R_3$ is selected from the group consisting of isopropyl, isobutyl and cyclohexyl radicals.

2. The substance, (N-(β-cyclohexylamino-)ether-N'-carboisopropyloxy)hexahydropyrazine, corresponding to the structural formula:

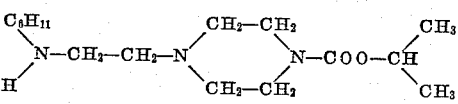

3. The substance, (N-(β-diisobutylamino)ethyl-N'-carbisopropyloxy-)hexahydropyrazine corresponding to the structural formula:

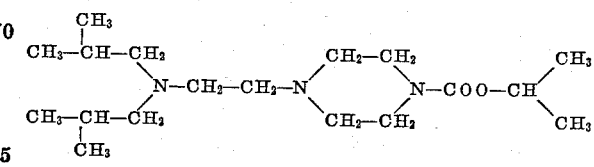

4. The substance, (N-(β-diisobutylamino-)ethyl, N'carbocyclohexyloxy)hexahydropyrazine corresponding to the structural formula:

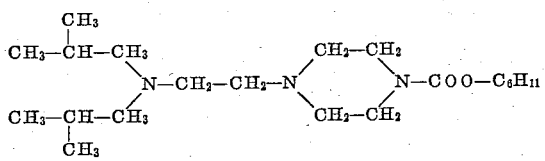

5. The substance, (N-(β-cyclohexylamino-)ethyl, N'carbocyclohexyloxy-)hexahydropyrazine corresponding to the structural formula:

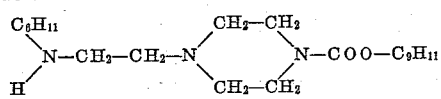

6. The substance, (N-(β-cyclohexylamino-)ethyl, N'carbethoxy-)hexahydropyrazine corresponding to the structural formula:

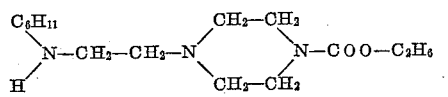

References Cited

UNITED STATES PATENTS

| | | | |
|---|---|---|---|
| 2,794,804 | 6/1957 | Kushner et al. | 260—268 |
| 2,880,209 | 3/1959 | Harfenist | 260—268 |
| 3,015,657 | 1/1962 | Geschickter et al. | 260—268 |
| 3,213,097 | 10/1965 | Forbes et al. | 260—268 |

OTHER REFERENCES

Harfenist, Journ. American Chemical Soc., vol. 79, pp. 2211–15 (1957).

Short et al., Journ. Medicinal Chemistry, vol. 6, pp. 275–283 (1957).

Stewart et al., Journ. of Organic Chemistry, vol. 13, pp. 134–143, (1948).

ALEX MAZEL, *Primary Examiner.*

HENRY R. JILES, *Examiner.*

JAMES W. ADAMS, *Assistant Examiner.*